(12) United States Patent
Sullivan et al.

(10) Patent No.: US 10,764,566 B2
(45) Date of Patent: Sep. 1, 2020

(54) MODULAR VIRTUAL REALITY HEADSET AND VIRTUAL REALITY SYSTEMS FOR USE IN PUBLIC VENUES

(71) Applicants: Scott Sullivan, San Francisco, CA (US); Phillip Lucas Williams, Glendale, CA (US); Jason Alderman, Duarte, CA (US)

(72) Inventors: Scott Sullivan, San Francisco, CA (US); Phillip Lucas Williams, Glendale, CA (US); Jason Alderman, Duarte, CA (US)

( * ) Notice: Subject to any disclaimer, the term of this patent is extended or adjusted under 35 U.S.C. 154(b) by 30 days.

(21) Appl. No.: 15/963,110

(22) Filed: Apr. 26, 2018

(65) Prior Publication Data

US 2019/0028697 A1 Jan. 24, 2019

Related U.S. Application Data

(60) Provisional application No. 62/535,731, filed on Jul. 21, 2017.

(51) Int. Cl.
| | | |
|---|---|---|
| *H04N 13/344* | (2018.01) | |
| *G09G 5/00* | (2006.01) | |
| *H04N 13/398* | (2018.01) | |
| *G06Q 20/32* | (2012.01) | |
| *G02B 27/01* | (2006.01) | |
| *G06F 1/16* | (2006.01) | |
| *G07F 17/16* | (2006.01) | |

(52) U.S. Cl.
CPC ....... *H04N 13/344* (2018.05); *G02B 27/0176* (2013.01); *G06F 1/163* (2013.01); *G06Q 20/327* (2013.01); *G07F 17/163* (2013.01); *G09G 5/006* (2013.01); *H04N 13/398* (2018.05)

(58) Field of Classification Search
CPC .. H04N 13/344; H04N 13/398; G06Q 20/327; G09G 5/006
USPC .......................................... 348/53
See application file for complete search history.

(56) References Cited

U.S. PATENT DOCUMENTS

| | | | |
|---|---|---|---|
| 2011/0185465 A1* | 8/2011 | Prinkey | A42B 3/22 2/15 |
| 2015/0199916 A1* | 7/2015 | Spangenthal | G09B 19/0038 434/247 |
| 2015/0268534 A1* | 9/2015 | Jikihara | G03B 11/00 396/448 |
| 2017/0337737 A1* | 11/2017 | Edwards | F16M 13/04 |
| 2018/0143420 A1* | 5/2018 | Ellis | G02B 27/028 |
| 2018/0260807 A1* | 9/2018 | Yang | G07F 11/00 |

* cited by examiner

*Primary Examiner* — Hee-Yong Kim (57) ABSTRACT

A modular VR system is provided with features that are specifically beneficial to public venues. The system includes a mask unit that is preferably custom fit to the user, and a modular, selectively-connectable viewing unit. The viewing unit houses all the required virtual reality optics and may be selectively secured to the mask unit. The mask unit includes an electrical memory which is electrically connected to the viewing unit when the two are connected. The viewing unit includes activatable covers to automatically protect the lenses whenever the viewing unit is disconnected from the mask unit. The viewing unit further includes a system to automatically adjust the distance between the lenses to match the interpupillary distance of the user. The viewing unit also includes an integral payment device and a handle.

18 Claims, 7 Drawing Sheets

MODULAR VIRTUAL REALITY HEADSET AND VIRTUAL REALITY SYSTEMS FOR USE IN PUBLIC VENUES

CLAIM OF PRIORITY

This application claims priority from U.S. Provisional Patent Application No. 62/535,731, filed Jul. 21, 2017, entitled: "Modular Virtual Reality Headset and Virtual Reality Systems for Use in Public Venues," the contents of which are incorporated herein in their entirety.

BACKGROUND OF THE INVENTION a) Field of the Invention

The present invention relates generally to electro-optical headgear, such as virtual reality (VR) goggles, and more particularly to such headgear which provide features suitable for use by many people in public settings.

b) Description of the Related Art

Virtual Reality (VR) refers to computer-aided generation of realistic images, sounds and other sensations for the purpose of replicating a real environment, often simulating a user's physical presence within a generated scene. VR headsets (or VR goggles), are often used as the interface, allowing the wearer to enjoy the immersive three-dimensional experience.

There are many different types of VR goggles commercially available today, but they all generally include a head-worn structure that supports a backlit video display, focusing lenses, and speakers. The display may be dedicated to the device (i.e., non-removable), or may share the display of an inserted smartphone. The device may include a dedicated microprocessor and battery onboard, or may be tethered by an electrical cable to a nearby computer and source of power.

During use, the display of the VR unit will generate light, conveying images and other information. The transmitted light will pass through the lenses and focus onto the retinas of the user's eyes. These systems are very basic in nature and work well for providing an effective illusion to the user during use.

Currently, the major companies offering products in this field, including Oculus Rift, Microsoft, Sony, Samsung, HTC, and Google, provide VR systems which are largely geared to personal and individual use. Applicants have recognized that VR systems will soon appear in more public locations, such as amusement parks, arcades, museums, and even fitness gyms. There are several compelling reasons for installing virtual reality systems in public places. A major one is that a public VR system will allow mundane content to be immersive and enveloping. Such an experience would invariably increase visitor traffic and, in turn, increase revenue, an exciting prospect for many public venues.

For example, providing VR headsets in a museum would provide curators and educators a new "fun" method to connect users with relatively complicated or difficult to understand content. Visitors to the museum could don a VR headset and enjoy a teleportation experience, bringing them back in time to explore a distant historic site, for example, in apparent real time. The experience could feature layered information, interpretation and sound. It would become a one-on-one historic lesson, allowing the user to shrink, fly and explore all sides of a structure or site in immersive 3D. It could completely separate users from their environment and even allow users to "occupy" different bodies so they could safely explore a point in history, but from another person's perspective.

All of this fantastic immersion has implications when it happens in public spaces and some of these implications can be negative. For example, a user enjoying a VR experience is typically separated from his or her environment. This separation from the real world puts the VR user and others nearby at risk of collision, where nearby objects could be accidentally hit during game play.

Another serious concern with VR headsets for use in public spaces is durability. Current commercially available VR headsets are complicated devices with accessible optics, delicate electronics and moving parts—they are instruments primarily designed for individual consumer use. Such delicate VR headsets, for example, would not survive long if offered for public use in the National Air and Space Museum of Washington, D.C.,—a museum that welcomes over 9 million visitors a year, especially considering that many of these visitors are animated school children with the innate ambition and uncanny ability to regularly touch every accessible surface. The delicate VR instruments would not have a chance.

Also considering the millions of potential users of publically available VR devices, hygiene is a legitimate concern. Sharing VR headsets with people you don't know can be quite unsanitary, especially when these devices include many surfaces that user's will repeatedly contact with their hair, face and fingers during each use. Strapping a virtual reality headset onto your face can feel uncomfortably intimate. Face masks can get warm, sweaty and grimy after each use, and lenses can fog up with other people's breath. Such cleanliness issues can make the wonderful immersive experience into a virtual world, less wonderful.

Apart from cleanliness issues, based on the fact that components contact each user's skin and hair, sharing virtual reality headsets can certainly carry health risks. For example, just like handrails and payphones, headsets could hypothetically play host some bacteria, which can survive a short period on inanimate surfaces like plastic. To prevent infection between subsequent users, VR headsets must be wiped down, preferably with soap and water.

To help address hygiene concerns, at a recent VRLA convention in Los Angeles, Calif., VR developers provided antimicrobial wipes, disposable face-masks, and replacement foam cushions for users of their VR headsets. Sony gave developers boxes of PlayStation-branded wet wipes, and Valve used protective paper covers on its Vive headsets during the convention. These solutions may be helpful to mitigate hygiene concerns, but they were either costly, potentially ineffective, or simply impractical for long-term public VR use, and in some cases, would require personnel to be present at each VR station, to apply a cleaning solution, for example.

Another concern with providing VR headsets to a public setting is that each person is different and many VR headsets require adjustment to each user. For example, the head-securing straps would likely require adjustment for each subsequent user. Also, for ideal use, the distance between the lenses of a VR headset should be adjusted to match the user's interpupillary distance (IPD). Most people have an IDP between 56 mm and 72 mm. Some VR systems utilize wide-diameter lenses which can accommodate a greater range of IDP without requiring adjustment, but a VR system designed for the general public will have to accommodate the IPD of every user, including people whose IPD resides outside this range. If the IPD is not correctly adjusted, the user of the VR system will be forced to squint to compensate and prolonged squinting often results in a headache and frustration.

A first object of the present invention is to provide a VR system that is suitable for public use and which overcomes the deficiencies of the prior art.

A second object of the present invention is to provide a VR system for public use which automatically protects the lenses when not in use.

Another object of the present invention is to provide a VR system for public use which allows for automatic adjustment to fit the user.

SUMMARY OF THE INVENTION

A modular VR system is provided with features that are specifically beneficial to public venues. The system includes a mask unit that is preferably custom fit to the user, and a modular, selectively-connectable viewing unit. The viewing unit houses all the required virtual reality optics and may be selectively secured to the mask unit. The mask unit includes an electrical memory which is electrically connected to the viewing unit when the two are connected. The viewing unit includes activatable covers to automatically protect the lenses whenever the viewing unit is disconnected from the mask unit. The viewing unit further includes a system to automatically adjust the distance between the lenses to match the interpupillary distance of the user. The viewing unit also includes an integral payment device and a handle.

The features of this invention, and the manner of attaining them, will become more apparent and the invention itself will be better understood by reference to the following description of the disclosed embodiments taken in conjunction with the accompanying drawings.

DETAILED DESCRIPTION OF THE PREFERRED EMBODIMENTS

By way of overview, the present invention solves specific important deficiencies with current virtual reality (VR) headsets regarding their use in a public setting. First, the present invention is modular and includes a mask portion and a viewing assembly. The viewing assembly includes features which help keep the optical system of the VR headset clean and inaccessible to the user's fingers. Second, the invention includes features which allow payment for VR services to be made quickly and easily on the device itself. Thirdly, the present invention allows for automatic adjustment of a user's interpupillary distance (IPD), in response to securing the viewing assembly to the mask portion, as described below.

Although the present invention is directed to improvements of so-called virtual reality headsets, the invention may be applied to any head worn electronic device that includes a lens and an electronic display screen, including such gear that houses dedicated LED display screens and also gear that selectively receives and "borrows" the display of a user's inserted smart phone. Also, the term "virtual reality" (VR) is meant to include so-called "augmented" (AR) and so-called "mixed reality" (MR) headsets. Also, the term "headset" is meant to include "goggles," "glasses," "masks," and "headgear."

Figure 1:
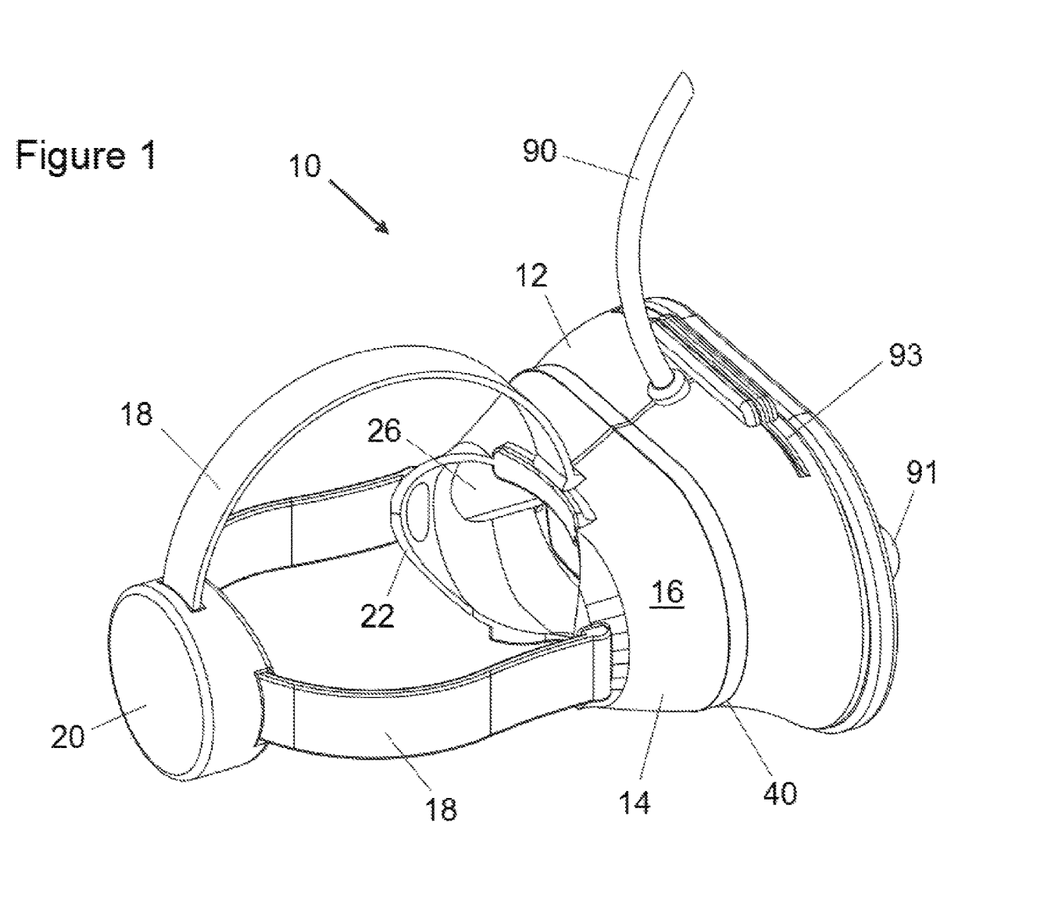
FIG. 1 is a rear perspective view of an exemplary VR headset, including a mask portion and a detachable viewer assembly with the mask portion shown secured to the viewer assembly, according to the present invention.
Figure 2:
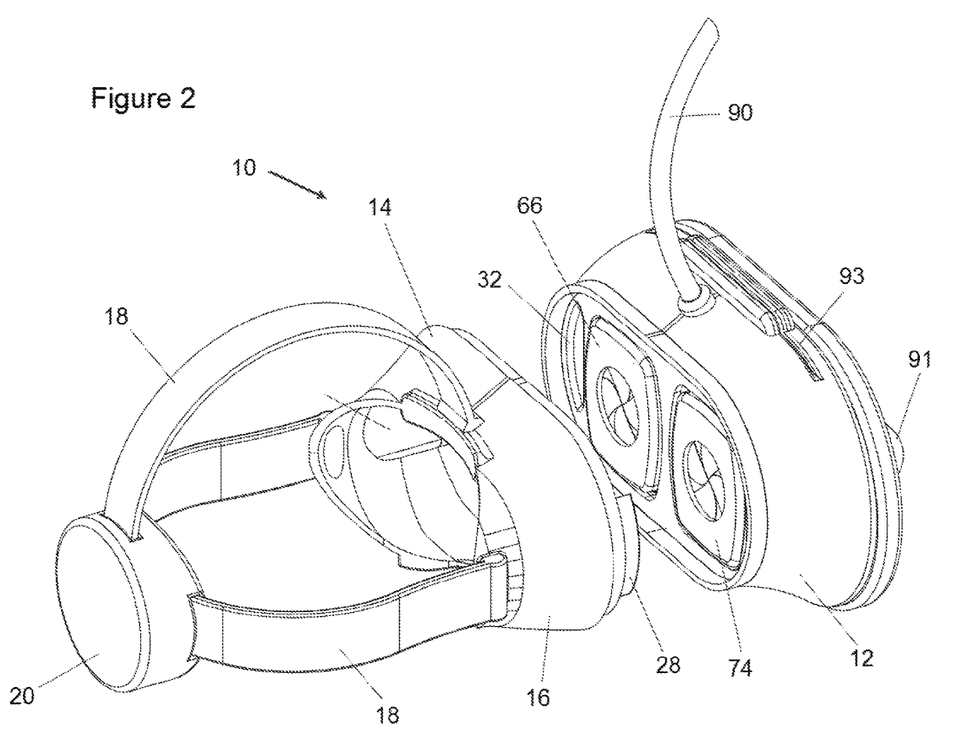
FIG. 2 is a rear perspective view of the exemplary VR headset of FIG. 1, showing the mask portion detached from the viewer assembly, according to the present invention.

According to the present invention and referring to FIGS. 1 and 2, an exemplary VR headset 10 for public use is shown. As described in greater detail below, an important aspect of the present invention is that the present VR headset is modular. The delicate optics, electronics and mechanisms are contained in a viewing unit 12, while the face and head contacting components are provided as a separate mask unit 14. This arrangement allows a user to purchase in advance (or they otherwise already own) their personal mask unit 14. Mask unit 14 includes a face shroud 16 which is sized and shaped to fit perfectly to the user's face and straps 18 which are sized and shaped to secure mask unit 14 snuggly to the user's head. Straps 18 may be conventional without departing from the gist of the present invention. A tightening mechanism 20 is shown in the figures to help the user tighten the straps 18. Tightening mechanism 20 may be used to contain batteries to power onboard electronics, or electronics themselves, including a small display (not shown) which would allow nearby participants to view in real time the virtual world being shown to the VR user. Tightening mechanism 20 may further purposely be designed to have a preset weight to help counter-balance the overhanging weight of viewing unit 12, when attached. By balancing headset 10 in this manner, mask unit 14 will not press so tightly against the user's face and will be more comfortable to wear for longer periods of time.

Face shroud 16 may be made from an appropriate lightweight plastic or rubber and its construction may include conventional features without departing from the gist of the present invention. As well understood by those skilled in the art, the edges and surfaces 22 of face shroud 16 which contact the user's face and nose during use should be made from or include a pliant, comfortable, durable and easily cleanable material (such as a closed-cell foam-rubber, with a firm surface skin) so that when donned on a user's face, the fit is comfortable and provides a lightproof seal between it and the user's face. Straps 18 are attached to appropriate locations of face shroud 16 so that when tightened, the tension in the straps provide an even and controllable compression force between face shroud 16 and the user's face, as is understood by those skilled in the art.

Figure 3:
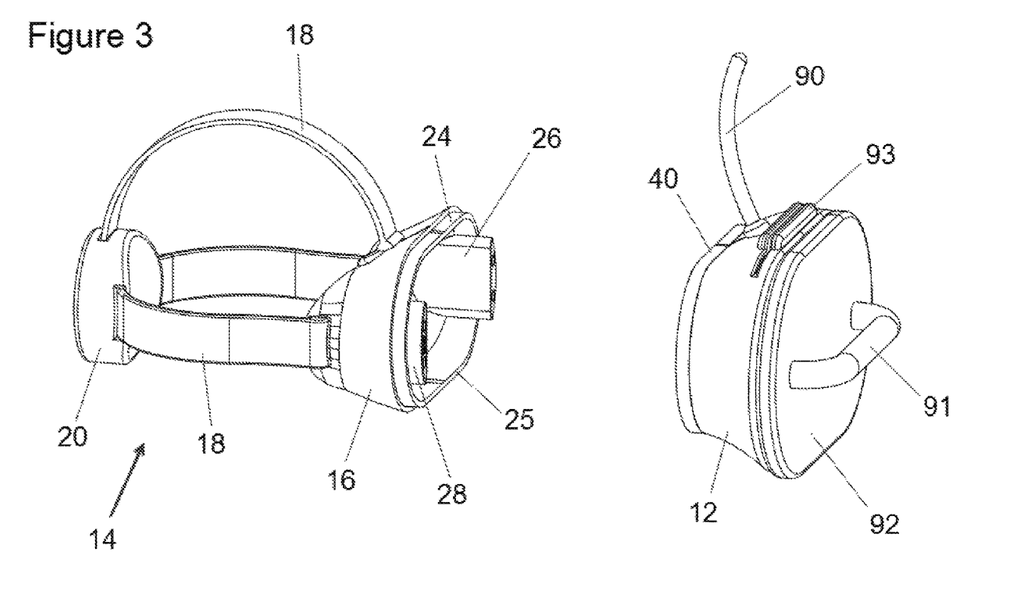
FIG. 3 is a side perspective view of the exemplary VR headset of FIG. 1, showing the mask portion detached from the viewer assembly, according to the present invention.
Figure 4:
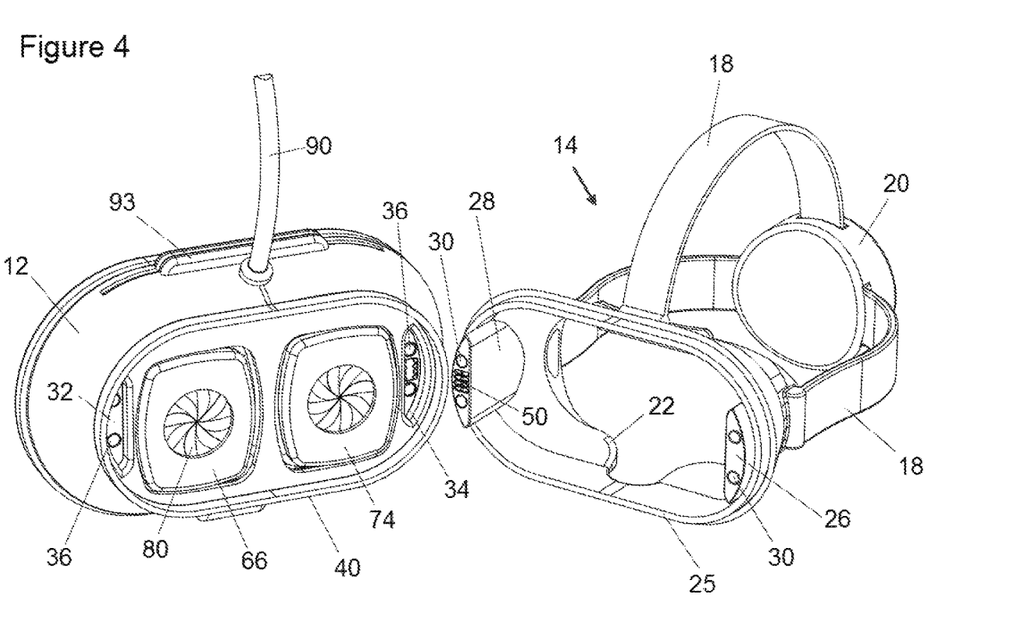
FIG. 4 is a perspective view of the exemplary VR headset of FIG. 1, showing the connection component details of both the mask portion and a detached viewer assembly, according to the present invention.
Figure 5:
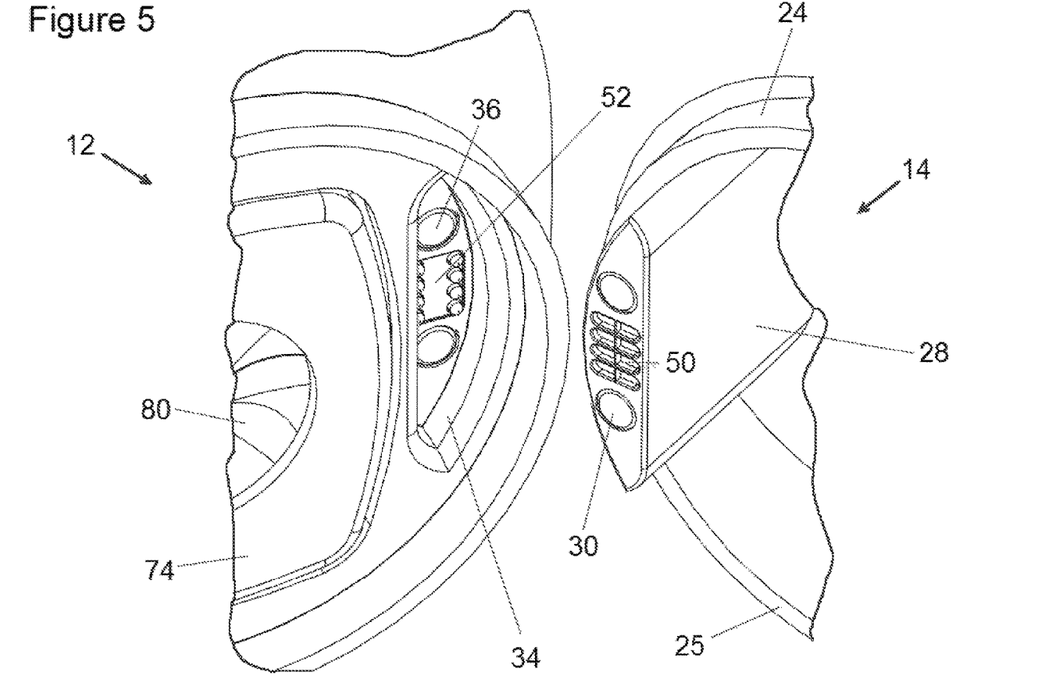
FIG. 5 is an enlarged perspective view of a right-side mechanical and electrical connection components, shown disconnected, according to the present invention.

Mechanical Registration (with Magnets):

According to the present invention and referring now to FIGS. 3, 4 and 5, mask unit 14 includes a modular-receiving end 24 (which is opposite face-contacting edges and surfaces 22), defining a connection edge 25, and two laterally opposing docking bosses, a left boss 26, and a right boss 28. As shown in FIGS. 4 and 5, each boss 26, 28 includes at least one boss magnet 30 (preferably two magnets are used). Boss magnets 30 are arranged with one pole facing away from the user's face towards a connected viewing unit 12. Magnets 30 may be any suitable strong magnet, but are preferably rare earth type magnets, such as samarium cobalt (SmCo) and neodymium-iron-boron (NdFeB), since rare earth magnets are very strong relative to their size. Viewer unit 12 includes two docking recesses, a left recess 32, and a right recess 34. These recesses are sized, shaped and positioned on viewer unit 12 to align with and snuggly receive respective docking bosses 26, 28, when viewing unit 12 is connected to mask unit 14, as explained below.

As shown in FIGS. 4 and 5, and according to the invention, at least one, but preferably two recess magnets 36, similar in size, type and strength to the above-mentioned boss magnets 30 are positioned within each recess 32, 34. Recess magnets 36 of left recess 32 are positioned to align with boss magnets 30 of left boss 26. Similarly, recess magnets 36 of right recess 34 are positioned to align with boss magnets 30 of right boss 28. Boss magnets 30 and recess magnets 36 are used to provide a securing tension force when bosses 26, 28 of mask unit 14 are inserted into respective recesses 32, 34 of viewing unit 12. Of course, boss magnets 30 and recess magnets 36 are oriented so that a pull force is generated between them. The pull force of the magnets will cause viewing unit 12 to "snap" into registered mechanical engagement with mask unit 14 when bosses 26, 28 of mask unit 14 are pushed into respective recesses 32, 34 of viewing unit 12, as shown in FIG. 1. An appropriate seal 40 is provided along a connection edge 25. Seal 40 may be located on mask unit 14, viewing unit 12 or both. Seal 40 prevents light, dust and moisture from entering past the connection edge 25, when viewing unit 14 is engaged with mask unit 12, as shown in FIG. 1.

Since it is not uncommon for a user enjoying an immersive experience to be somewhat animated, moving their head and body around in their virtual world, magnets 30, 36 must be strong enough to prevent accidental separation of mask unit and viewing unit during the user's dynamic motions.

Electrical Connection:

Referring now to FIGS. 4 and 5, and according to the invention, right boss 28 further supports a boss electrical connector 50. Right recess 34 includes a recess electrical connector 52. Recess connector 52 and boss connector 50 are positioned to electrically engage with each other when right boss 28 is fully inserted into right recess 34. Any of many conventional electrical connectors may be used here without departing from the gist of the present invention. For example, a suitable connector for this application is a connector called a "Pogo Pin" connector, manufactured by Everett Charles Technologies, LLC. of Fontana, Calif. Regardless, the purpose of boss connector 50 and recess connector 52 is to provide selective and controlled electrical communication between mask unit 14 and viewing unit 12 when the two units are connected to each other, as further described below.

Figure 7:
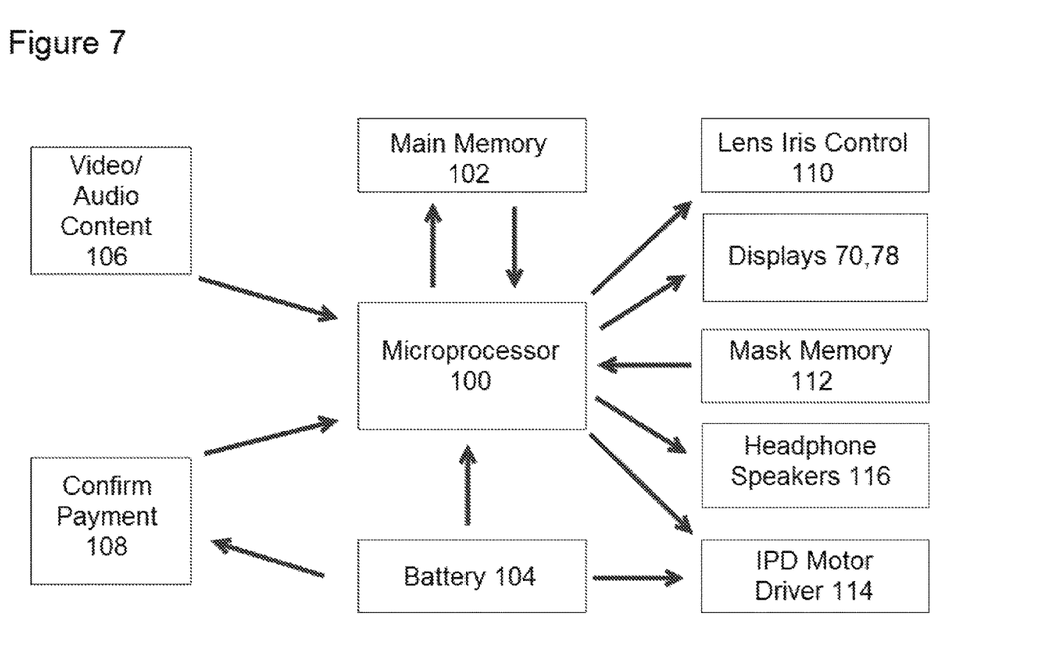
FIG. 7 is an operational schematic of the VR system used in combination with the VR headset of FIG. 1, according to the invention.

As shown in FIG. 7 (which is described in greater detail below) and according to the present invention, mask unit 14 includes an electrical mask-memory circuit 112, preferably located within right boss 28. Mask memory circuit 112 (including any required supporting circuitry) is electrically connected to the terminals of boss electrical connector 50 (the actual connection is not shown in the figures, but such conventional electrical connection is well known by those skilled in the art).

As described in greater detail below (in FIG. 7), when viewing unit 12 is snapped into engagement with mask unit 14, electrical connection between mask memory circuit 112 and a microprocessor 100 of viewing unit 12 is made through electrical connectors 50, 52. The purpose of mask memory circuit 112 is to identify mask unit 14, and it's user, as explained below.

Figure 6:
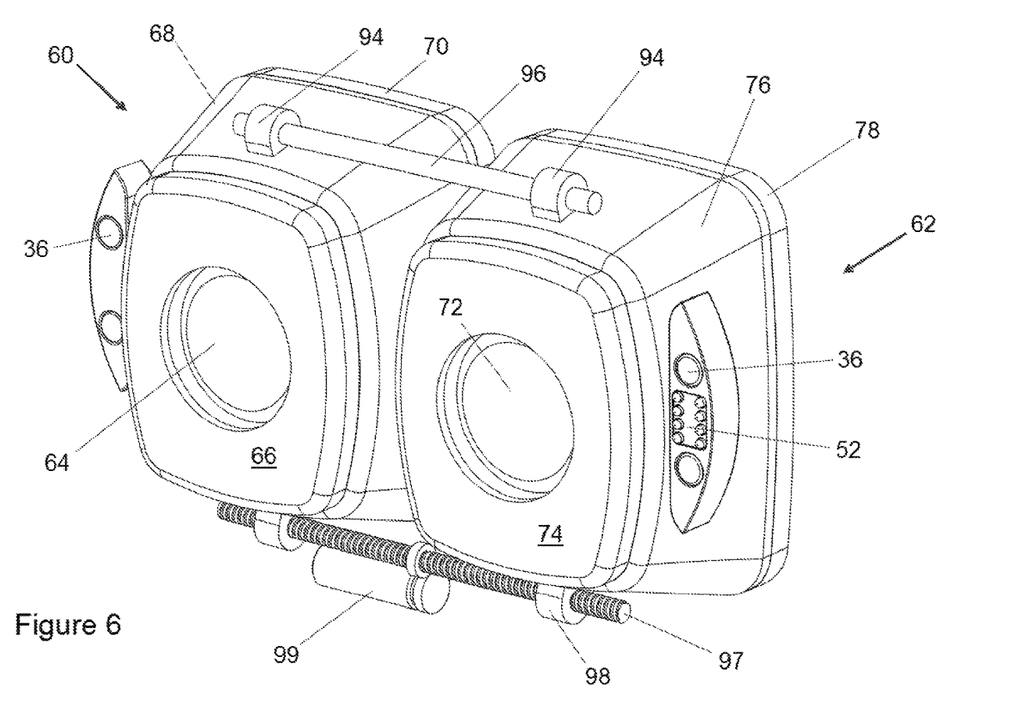
FIG. 6 is a perspective view of an unshrouded viewer assembly, revealing details of two lens assemblies, including an IPD adjustment system, according to the present invention.

Viewing Unit:

Referring now to FIGS. 4 and 6, and according to the invention, viewing unit 12 is shown including two lens assemblies, a left lens assembly 60, and a right lens assembly 62. Left lens assembly includes a left lens 64, a left lens protector 66, a left viewing shroud 68 and a left display 70. Similarly, right lens assembly 60 includes a right lens 72, a right lens protector 74, a right viewing shroud 76 and a right display 78.

In operation of conventional VR systems, as is understood by those skilled in the art, a carefully generated image is displayed on each display 70, 78. Each lens 64, 72 is used to allow the user's eyes to independently view each respect display in focus and without distortion. Each lens shroud 68, 76 is used to ensure that no external light enters the system during use. The present VR system operates similarly, but includes important features that help overcome deficiencies of the prior art VR systems, especially those systems which are intended for public use.

Lens Protection:

According to the invention, each lens is covered by lens protector 66, 74, which may employ any of several different mechanical covering structures, but is preferably a structure similar to the structure of a conventional mechanical iris (or diaphragm) used to control the passage of light through a camera lens in photography.

As is well known, this diaphragm structure is made up of radially disposed, individually pivotal petal-like plates 80. Each plate, which is made from strong lightweight thin metal or an appropriate opaque plastic (such as Acrylonitrile Butadiene Styrene (ABS)) may selectively and simultaneously pivot between a deployed orientation, wherein collectively, the radial plates effectively cover and protect the entire surface of the otherwise exposed lens, and a retracted position, wherein each plate 80 pivots past the edge of the lens so that the entire lens becomes exposed and functional. Other effective shutter-like mechanisms may be employed to selectively cover and protect lenses 64, 72, when viewing unit 12 is disconnected from mask unit 14, including a single panel or plate (not shown) that slides across each lens, when instructed to do so, to protect the lenses, and then slides back to reveal the lenses when desired. Plates 80 are made to handle accidental contact with a user's finger without damage.

Whichever type of lens protector is used to selectively protect the lenses, each lens protector is preferably automatically operated, either solely mechanically, or mechanically as driven using an electromagnetic actuator, such as a servo-motor, a solenoid, or an electromagnetic linear drive. Other drive devices may be used as well, as is well understood by those skilled in the art. In one contemplated all mechanical arrangement, all radial plates 80 of protectors 66, 74 are spring biased using a spring linkage (not shown) to a closed and protective orientation, as shown in FIG. 4, but when a user engages viewer unit 12 with mask unit 14, a projection (not shown) on mask 14 aligns and engages with the spring linkage and mechanically forces the linkage to open all radial plates 80 together. This allows the user to see through lenses 64, 72 only when viewer unit 12 is properly secured to mask 14. When viewer unit 12 is later disconnected from mask unit 14, the projection of mask unit 14 disengages from the spring linkage of viewer unit 12, which causes the spring-biased linkage to close the radial plates 80 to once again protect lenses 64, 72, as before.

It is preferred that lens protectors 66, 74, whichever type are used, are automatically driven by a driver and a lens iris control circuit 110 (as shown in FIG. 7, described below), which is in turn, controlled by microprocessor 100.

Power and Computer Connection:

As shown in FIGS. 1-4, viewing unit 12 may include an electrical umbilical cord 90, which preferably extends vertically up to a point on the ceiling so that the viewing units may hang from the ceiling, when not being used. Once a viewing unit 12 is connected to a mask unit 14 by a user, umbilical cord 90 may supply all necessary power and computer data signals for operation of viewing unit 12. Depending on the particular venue, this ceiling-suspended arrangement is preferred since it keeps power and computer cords safely out of the way. This system is similar to how automotive repair garages typically suspend air supply hoses and various oil hoses from the ceiling of the garage. Furthermore, a nearby central controller may be used to activate a winch-like device to retract all or select viewer units 12 up higher towards the ceiling out of reach when the units are not being used, to avoid tampering or damage by miscreants. Since each viewing unit 12 is electrically tethered and continuously connected, no batteries are required and each unit is fully powered and ready to be used at anytime. The electrical umbilical cord 90 preferably includes all required power and data cables, as well as a strong cut-resistant support cable that will ensure that the weight and handling of viewing unit 12 will not damage or break the power or data cables.

This ceiling mounted arrangement, for example, could be suitable for such venues as a fitness gym, whereby a viewing unit 12 may be suspended above each running treadmill and elliptical machines, high enough to be out of the way, unless requested to be used by the user or an operator, at which point, the selected viewing unit 12 would be lowered from the ceiling to a point that is suitable for use by the user. According to the invention, it is preferred that umbilical cord 90 includes a spring-biased length of slack cord which would provide additional cord length, if suddenly needed, such as if a user suddenly stepped off an exercise machine to a lower point (the floor). Also, if required, viewing unit 12 may be automatically detachable from mask unit 14 if the magnitude of tension generated along umbilical cord 90 exceeds the pulling force of boss and recess magnets 30, 36—the magnets will just release the two units, allowing the delicate viewing unit 12 to simply just swing safely in the air, until it can be reattached.

Of course, alternative to using umbilical cord 90, all power and computer equipment for viewing unit 12 may be provided on board the unit itself in the form of a battery 104 (see FIG. 7), but this requires that the batteries be continuously replaced and recharged, ready for use at all times.

Handle:

Each viewing unit 12 preferably includes a handle 91 on the front surface 92 to help the user or the operator handle a viewing unit when connecting and disconnecting it from mask unit 14.

Payment Reader:

According to another feature of the present invention, as shown in FIGS. 1-4, a charge-card reader 93 is provided on viewer unit 12, so that a user may pay for a VR experience directly on the unit itself. The charge card transaction may be completed using connected server via umbilical cord 90, or wirelessly using any appropriate means, such as WiFi, or Bluetooth®. The charge card reader shown is an older conventional sliding type whereby the user slides his or her credit card so that the reader may read the magnetic information strip located on the rear of the card. This is well known by those in the art and the details are beyond the scope of the present invention. Other readers may be used, such as the insertion type reader which is designed to read the smart chip located on newer type payment cards. Also, onboard WiFi and Bluetooth circuits may be used to receive or process payment through the use of smart devices, also well known by those in the art. According to this feature of the invention, it does not matter how payment is made, just that the reading device to carry out the payment is provided integrally with the viewing unit 12.

Interpupillary Distance Control:

According to another feature of the present invention and referring to FIG. 6, left lens assembly 60 and right lens assembly 62 are slidably mounted with respect to each other. A slide bushing 94 is secured to a portion of left viewing shroud 68 and right viewing shroud 76 and are both sized and positioned to receive a slide-bar 96. Slide bar 96 is positioned so that each lens assembly 60, 62 may slide side to side, laterally with respect to the viewing axis of the lenses, as illustrated by Arrow 97 in FIG. 6. With this arrangement, the lateral distance between the lenses may be adjusted by sliding the two lens assemblies 60, 62 along slide bar 96. Although only a single slide bar 96 is shown, additional parallel slide bars (not shown) may be used in a similar manner to provide stability and support to lens assemblies 60, 62.

To help control the lateral displacement of lens assemblies 60, 62, a lead-screw 97 positioned parallel to slide bar 96 is attached to each lens assembly 60, 62. Lead-screw 97 includes reverse threads along half its length. A threaded nut 98 is affixed to each lens assembly. Each nut is threaded to match the thread-direction of lead-screw 97, depending on the side (either right hand or left hand threads). An appropriate servo motor 99 is mounted adjacent lead-screw 97 and is mechanically connected so that activation of servo motor 99 causes lead-screw 97 to rotate, in either direction, depending on the driven rotation of servo motor 99. When lead screw rotates in a first direction, the opposing threads will cause lens assemblies to displace laterally towards each other, thereby decreasing the distance between lenses 64, 72. When lead screw 97 rotates in the opposite direction, lens assemblies displace laterally away from each other, thereby increasing the distance between the lenses 64, 72. With this arrangement, as described below, control of the operation of servo motor 99 will thereby effectively control the distance between the lenses. This method can be used to quickly move the lenses to match the Interpupillary Distance (IPD) of the particular user.

In Operation:

Referring to FIG. 7, and in operation, according to one embodiment of the invention, viewing unit 12 includes a microprocessor 100, a main memory 102 connected to microprocessor 100, and a battery 104 connected to all devices that require power. A video/audio content 106 is connected to microprocessor 100. A mask memory 112 and a payment system 108 are connected to microprocessor 100. Microprocessor 100 is further connected to an IPD motor driver circuit 114 and a lens Iris control circuit 110.

When a user wishes to use a viewing unit 12 to enjoy an immersive virtual experience at a public venue, such as at a fitness gym, he or she either rents a mask unit 14 at a nearby location, or preferably brings her own mask. Her mask would have been properly fitted by a technician to ensure that the mask fits her head and face. During the fitting process, the technician would use known devices to accurately measure the user's interpupillary distance and uploads this information onto mask memory 112, using known recording devices. In the case where the user requires the use of prescription eyewear, the personal mask unit 14 may also be provided with supplemental lenses, so that the user does not have to wear her glasses when wearing her mask.

Since the user preferably owns his or her own mask unit 14 that properly fits his or her face and includes at least information regarding the user's interpupillary distance stored in the onboard mask memory 112. The user reaches up and grabs the handle 91 of a select viewing unit 12 he or she wishes to connect with, and pulls the unit down. As mentioned above, the viewing unit 12 is preferably tethered to the ceiling by umbilical cord 90. An appropriate deploying device automatically provides required slack in the umbilical cord for the user to access the viewing unit.

Once viewing unit 12 is accessible, the user will follow instructions to pay for the use of the VR device. Of course, payment may be made in various conventional ways, including the use of their smartphone, or credit card, or other. The present invention integrates a charge card reader 93 with viewing unit 12 to receive and read a credit card of the user. The user would simply slide (or insert) their credit card into charge card reader 93 to pay for the VR service. Once payment is made, however it is made, a confirm payment signal is sent from payment processing system 108 to microprocessor 100, located either on board the select viewing unit 12, or as described above, to a nearby server.

Microprocessor 100 then sounds an onboard speaker 116 to instruct the user to connect viewing unit 12 into their mask unit 114. The user aligns bosses 26, 28 of his or her mask unit 14 with recesses 32, 34 and then inserts the bosses into the recesses until boss magnets 30 "find" recess magnets 36 and the attraction force pulls viewing unit 12 firmly into engagement with mask unit 14. At this point, boss electrical connector 50 makes electrical connection with recess electrical connector 52. This connection effectively allows data located in mask memory 112 to be read by microprocessor 100, located either on viewing unit 12 or a nearby server (not shown).

Once viewing unit 12 is connected to the user's mask unit 14, microprocessor 100 reads the interpupillary distance information from mask memory 112 and stores it in main memory 102. Microprocessor 100 then uses this information to instruct IPD motor control circuit 114 to drive servo motor 99 to rotate lead screw 97 a prescribed amount. This action causes left and right lens assemblies 60, 62 to laterally displace until the distance between lenses 64, 72 equals the user's interpupillary distance, as indicated by the data stored in mask memory 112, and subsequently read by microprocessor 100. Microprocessor 100 also uses the electrical connection to mask unit 14 to detect that mask unit 14 is connected to viewing unit 12. Should the electrical connection be broken, microprocessor 100 will immediately detect the separation.

Of course, mask memory 112 may include any information, including a user ID, instead of actual interpupillary distance information. The user ID can then be read by microprocessor 100 and compared with stored information regarding that particular user located in a nearby server. The stored information on the server may include the user's interpupillary distance information, and perhaps also information regarding which video content is preferred by the user and which content has already been viewed.

Once lenses 64, 72 have been properly adjusted to fit the user, microprocessor will cause left and right lens protectors 66, 74 to open, as described above, and begin to display video content from a video/audio content source 106 onto displays 70, 78. Audio content would similarly be played on speakers or headphones 116, as understood by those skilled in the art. The user may now enjoy their VR experience.

The user may disconnect viewing unit 12 from his or her mask unit 14 simply by using handle 91 to pull the two units apart until the pulling force overcomes the attraction force of boss and recess magnets. Once separated, electrical connection between viewing unit 12 and mask unit 14 will be lost and microprocessor 100 will instantly detect this and instruct lens iris control 110 to close plates 80 to cover and protect lenses 64, 72. Additionally, detection that viewing unit 12 is separated from mask unit 14, microprocessor 100 may instruct the ceiling mechanism to engage and raise viewing unit 12 up towards the ceiling to be safely stowed until requested once again.

What is claimed is:

1. A modular virtual reality headset, comprising:
    a mask having a face-contacting end and an opposing open end, said face-contacting end being sized and shaped to snuggly fit a user's face when worn, said open end defining a first connecting rim;
    a strap attached to said mask for selectively securing said mask to said user's face;
    a viewing unit having a face-directed end and an opposing outward surface, said viewing unit including a display for showing video content, a lens, and controlling circuitry, said lens being positioned between said display and said face-directed end, said viewing unit being selectively attachable to said mask so that said face-directed end contacts said first connecting rim and so that said user may view said video content of said display through said mask and said lens; and
    a fastener for retaining said viewing unit against said first connecting rim of said mask.

2. The modular virtual reality headset of claim 1, wherein said fastener includes magnets.

3. The modular virtual reality headset of claim 1, wherein said mask includes an electronic memory for storing digital information regarding said user, said electronic memory being in electrical communication with said controlling circuitry when said viewing unit attaches to said mask.

4. The modular virtual reality headset of claim 3, wherein said electrical communication is established by a first electrical connector located on said mask and a second electrical connector located on said viewing unit, said first and second electrical connectors being sized, shaped and positioned to electrically connect when said viewing unit is attached to said mask.

5. The modular virtual reality headset of claim 1, further comprising a displaceable shield located between said lens and said face-directed end, said shield being displaceable between a deployed position, wherein said lens is protected from outside contact, and a retracted position, wherein said lens is exposed and usable.

6. The modular virtual reality headset of claim 3, further comprising two adjacent and displaceable lenses positioned to align with the eyes of said user when said headset is worn, each of said lens being laterally adjustable with respect to each other.

7. The modular virtual reality headset of claim 6, wherein said lateral adjustment being controlled automatically by an electrical-powered drive mechanism.

8. The modular virtual reality headset of claim 7, wherein said electrical drive mechanism is controlled by said controlling circuitry and information regarding said lateral adjustment for said user being stored on said electronic memory located on said mask.

9. The modular virtual reality headset of claim 5, wherein said shield is controlled by said controlling circuitry so that said shield is located in said deployed position when said viewing unit is separated from said mask and located in said retracted position when said viewing unit is attached to said mask.

10. The modular virtual reality headset of claim 5, wherein said shield automatically moves to said retracted position by said control circuit in response to said display showing video content.

11. The modular virtual reality headset of claim 1, further comprising a handle attached to said outside surface of said viewing unit.

12. The modular virtual reality headset of claim 1, wherein said viewing unit further comprises an electronic payment transaction module for allowing said user to pay for said video content, said payment transaction module being adapted to at least receive electronic payment-transfer information from said user.

13. A modular virtual reality headset for use by a user having a face and eyes, said modular virtual reality headset, comprising:
  a mask having face-contacting end and an opposing open end, said face-contacting end being sized and shaped to snuggly fit said a user's face when worn, said open end defining a first connecting rim;
  a strap attached to said mask for selectively securing said mask to said user's face;
  a viewing unit having a face-directed end and an opposing outward end, said viewing unit including a display for showing video content, a lens, and controlling circuitry, said lens being positioned between said display and said face-directed end, said viewing unit being selectively attachable to said mask so that said face-directed end contacts said first connecting rim and so that said user may view said video content of said display through said mask and said lens; and
  at least one magnet located on either of said mask and said viewing unit and a magnetic-attractive element located on the other of either of said mask and said viewing unit, said magnet and said magnetic-attractive element aligning with each other when said viewing unit is aligned with said open end of said mask so that said resulting pull force created by said aligned magnet and said magnetic-attractive element holds said viewing unit to said mask.

14. The modular virtual reality headset of claim 13, wherein said mask includes an electronic memory for storing digital information regarding said user, said electronic memory being in electrical communication with said controlling circuitry when said viewing unit attaches to said mask.

15. The modular virtual reality headset of claim 14, wherein said electrical communication is established by a first electrical connector located on said mask and a second electrical connector located on said viewing unit, said first and second electrical connectors being sized, shaped and positioned to electrically connect when said viewing unit is attached to said mask.

16. The modular virtual reality headset of claim 13, further comprising a displaceable shield located between said lens and said face-directed end of said viewing unit, said shield being displaceable between a deployed position, wherein said lens is protected from outside contact, and a retracted position, wherein said lens is exposed and able to pass video content between said display and said user's eyes.

17. The modular virtual reality headset of claim 14, further comprising two adjacent and displaceable lenses positioned to align with said eyes of said user when said headset is worn, each of said lens being laterally adjustable with respect to each other.

18. The modular virtual reality headset of claim 16, wherein said shield is controlled by said controlling circuitry so that said shield is located in said deployed position when said viewing unit is separated from said mask and located in said retracted position when said viewing unit is attached to said mask.

* * * * *